Jan. 15, 1935.  E. J. SCHMIDT  1,987,753
BELT DRIVE
Filed Feb. 21, 1934   4 Sheets-Sheet 3

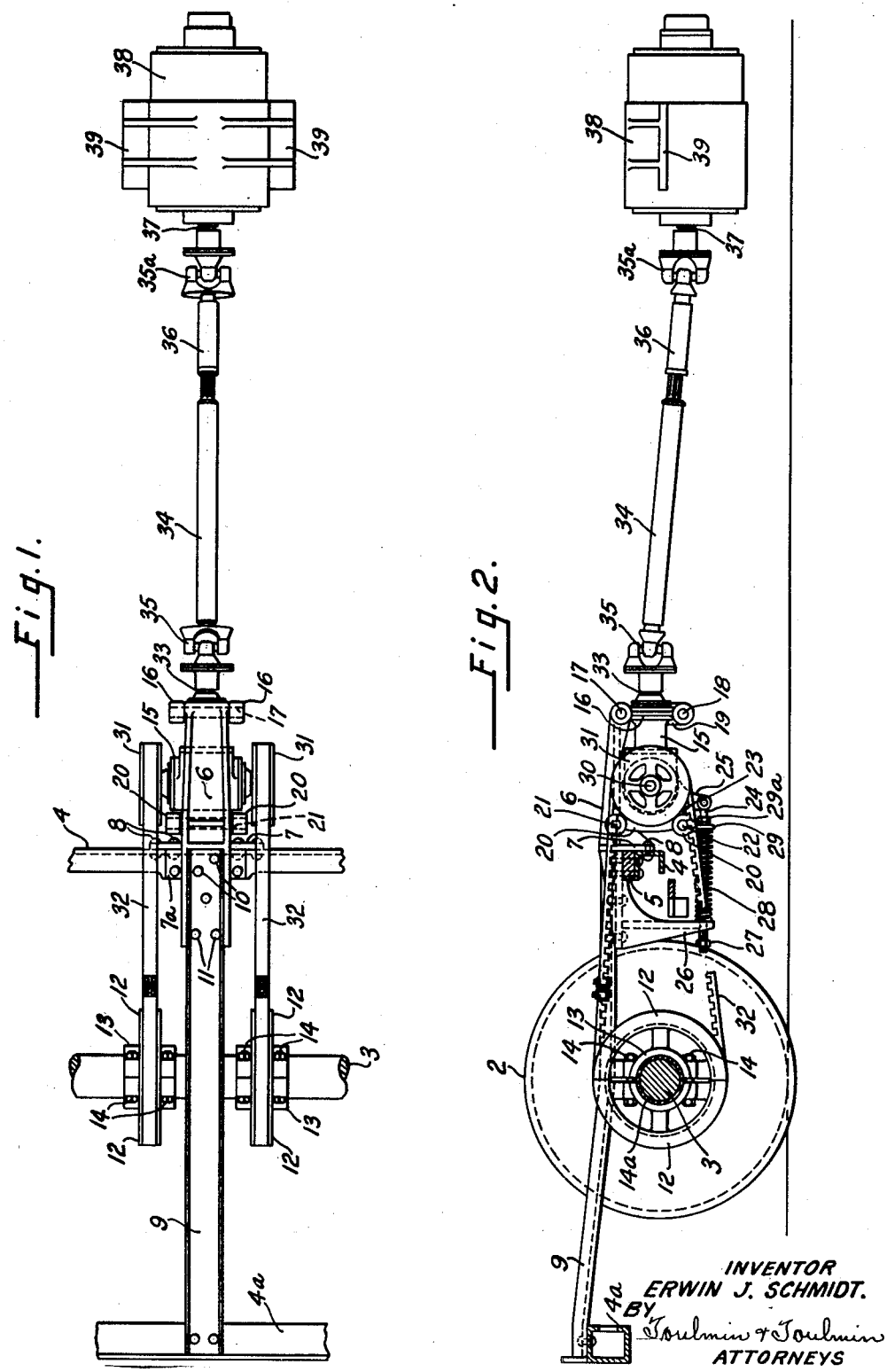

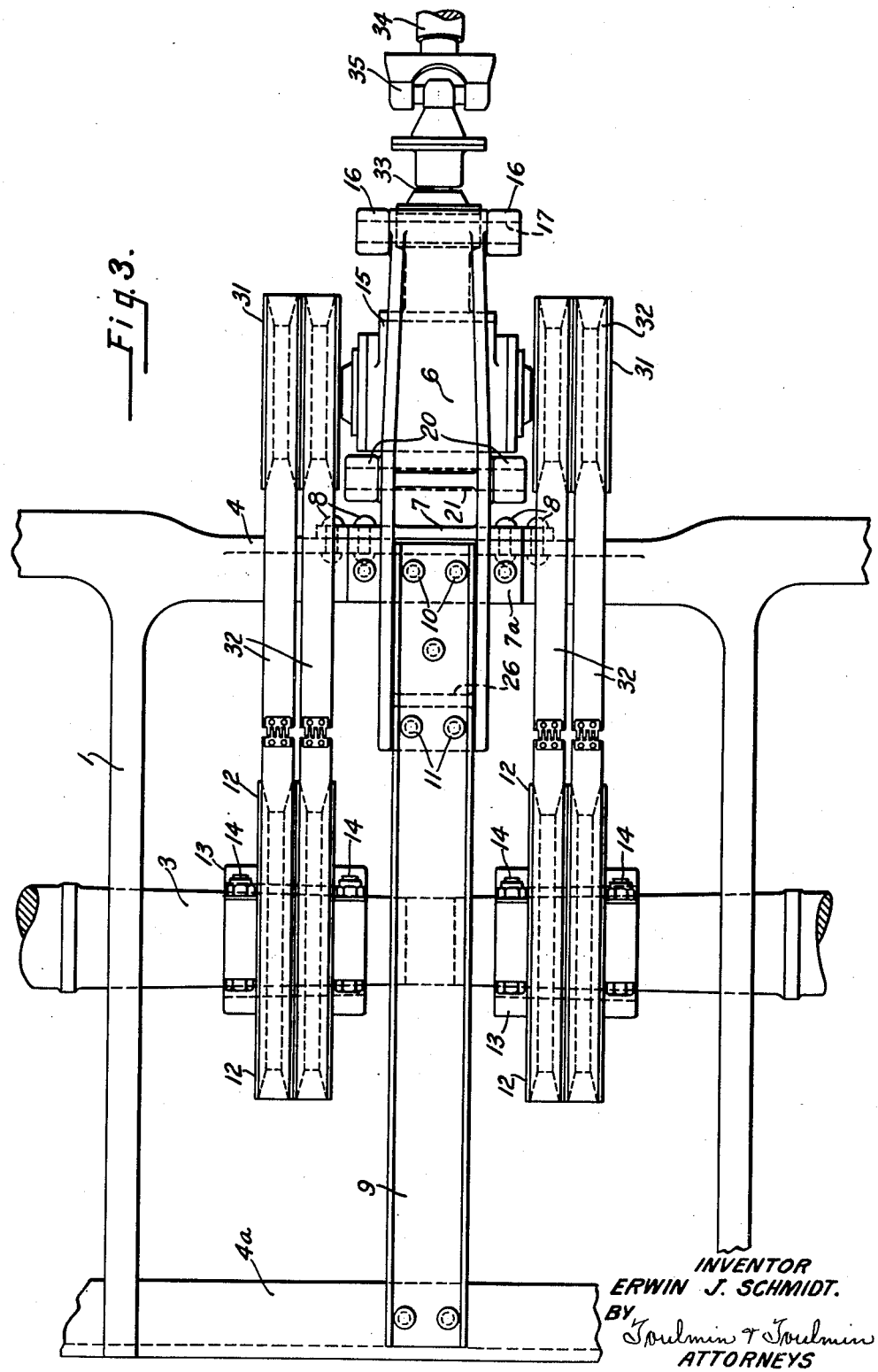

*INVENTOR*
*ERWIN J. SCHMIDT.*
BY Toulmin & Toulmin
*ATTORNEYS*

Patented Jan. 15, 1935

1,987,753

UNITED STATES PATENT OFFICE 1,987,753

BELT DRIVE

Erwin J. Schmidt, Chicago, Ill., assignor to The Dayton Rubber Mfg. Company, Dayton, Ohio, a corporation of Ohio Application February 21, 1934, Serial No. 712,361

3 Claims. (Cl. 105—102)

This invention relates to improvements in driving mechanism adapted to be used in connection with railway cars, and has for its object to provide means for taking off power from the car truck for operating a generator supported on the car body, or the frame thereof.

It is particularly the object of this invention to provide, in connection with the axle of a car truck, means for driving from the axle a longitudinally extending shaft, to one end of which is operatively connected a generator, the connection between the axle and the generator being such that any movement of the body with relation to the truck or axle thereof is taken care of because of the particular construction of the shaft.

It is an object of this invention to provide, in connection with a car body, a transverse shaft operatively connected to the axle of the truck supporting the body for operating a generator through a gear mechanism supported by the truck, and a longitudinally extending telescopic shaft.

It is an object of this invention to provide, in connection with a truck for supporting a car body, and an axle supporting the truck, a bracket supported by the truck having thereon a swingingly supported gear box which has supported therein a shaft with a pulley on each end connected by means of a belt to a pulley fixed to the axle for rotating the gear box shaft.

It is also an object of the invention to provide a resilient adjustable means for tensioning the belt between the transverse shaft and the axle so that any movement transmitted to the gear box will not interfere with the operation of the belts.

It is a further object of this invention to provide, in connection with a car having a supporting axle, a longitudinally extending, centrally arranged shaft driven by the axle for operating a generator, said generator being either in line with the shaft and directly connected thereto by universal joints, or out of alignment with the shaft and supported to one side of the body, beneath it, and connected to a countershaft operated by the longitudinally disposed shaft by means of V-shaped belts fitting in V-grooved pulleys.

It is an object to provide driving mechanism of the character described on a pivoted truck, beneath the car; a rigidly supported generator on the bottom of the car remote from the truck and an interconnecting driving means, the length of which is self-adjusting depending upon the swinging of the truck with respect to the generator; and to provide in this connection a cradle for supporting an intermediate gear box on the truck, between the driving mechanism thereof and the telescopic shaft which is connected to the generator. This cradle is so arranged that the gear box will swing fore and aft with respect to the longitudinal axis of the truck but will not pivot or twist laterally.

These and other objects and advantages will appear from the following description taken in connection with the drawings.

Referring to the drawings:

Figure 1 is a top plan view of part of the truck frame, showing a part of the truck axle with the power transmitting mechanism connected to the axle and supported by the truck frame.

Figure 2 is a side elevation of the power transmitting means with the generator connected thereto, showing a part of the truck frame and the axle in section, with one supporting wheel for the axle.

Figure 3 is a view similar to Figure 1 but showing a plurality of grooves in the pulleys, whereas a single groove is shown in Figure 1.

Figure 4:
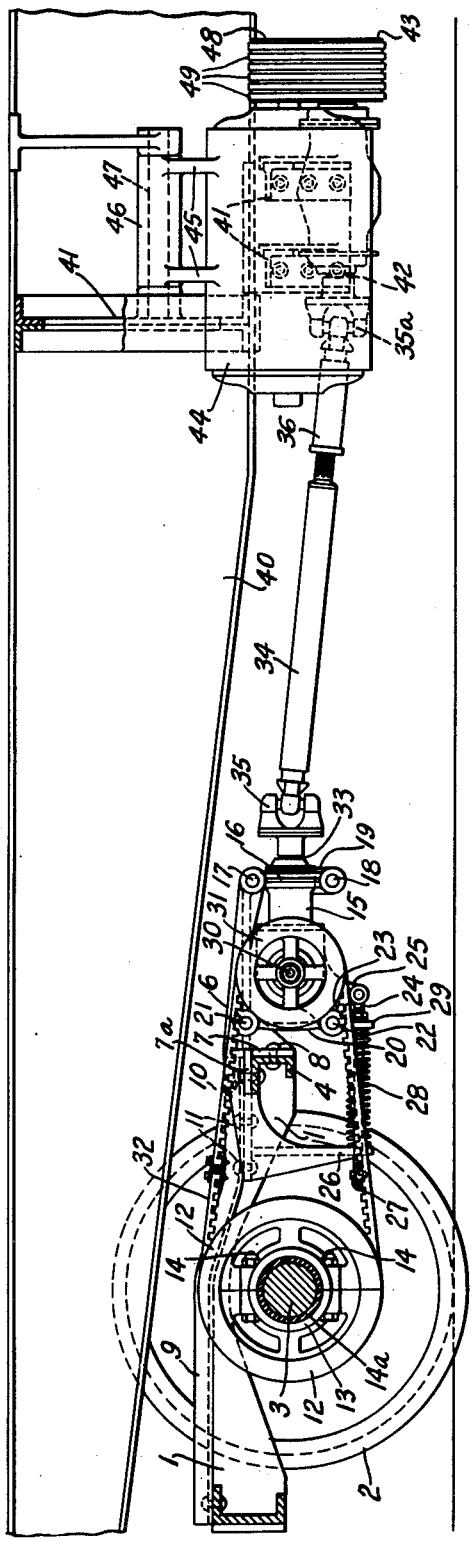

Figure 4 is a vertical longitudinal section through the frame part of a car body and the truck supporting the body, showing the power transmitting mechanism in side elevation and the generator driven thereby shown in side elevation. In this form the generator is driven from the longitudinally extending shaft by means of belts and pulleys, and is located beneath the body at one side, while the shaft extends longitudinally of the body, beneath the center thereof.

Figure 5:
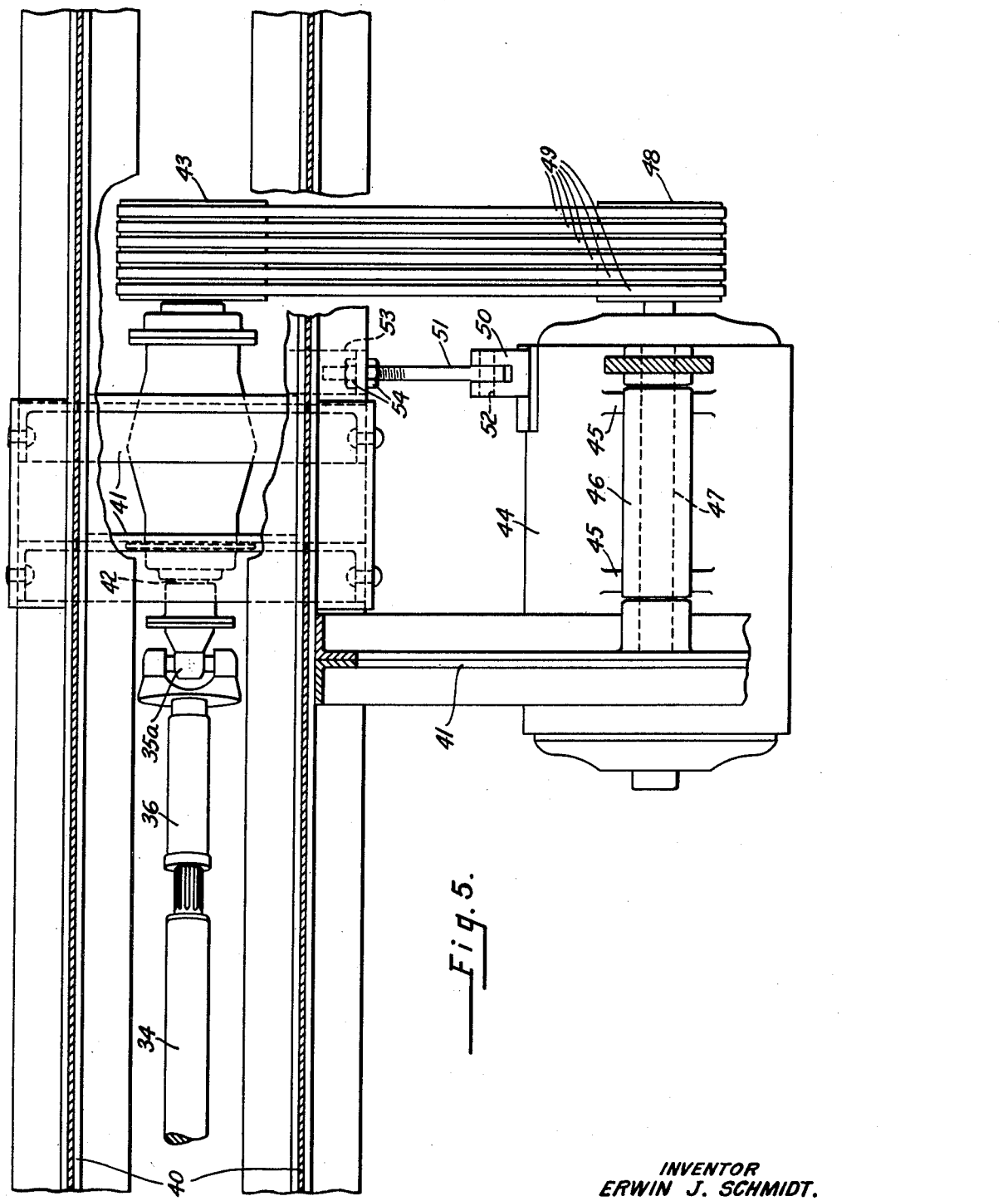

Figure 5 is a top plan view showing the generator, the counter-shaft and the drive connection between the counter-shaft and the generator.

Figure 6:
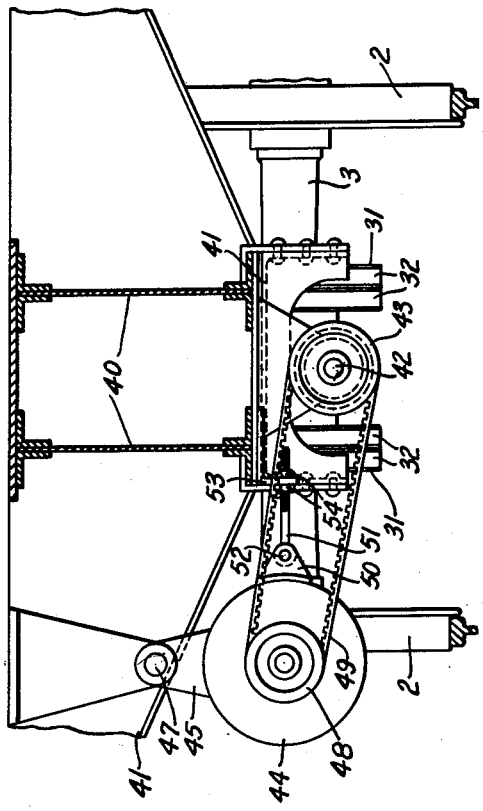

Figure 6 is an elevation showing the frame supported beneath the car body used for supporting the counter-shaft, and showing the counter-shaft with the generator operatively connected to the counter-shaft, and means for adjusting the generator with relation to the counter-shaft.

The present drive mechanism is shown in connection with a railroad car, the body of which is represented merely by a frame which is supported by the usual truck members, only a part of one of which is shown. The truck frame, as far as shown, is indicated by the numeral 1 and is supported by wheels 2 and an axle 3. The frame has the usual end sill 4, which has attached to the center thereof a suspension bracket 6 which is spaced from the end sill by means of a spacer 5 to give proper belt clearances above the end sill. There is also provided another sill 4a. These sills are connected by the channel iron member. The connection between the end sill and the suspension bracket is braced by means of a brace plate 7 formed integral with the suspension bracket and engaging one side of the end sill and attached thereto by means of rivets 8.

Extending longitudinally of the frame and midway between the wheels, is a channel iron member 9. One end of this channel iron member is attached to a brace plate 7a of the suspension bracket and the end sill by means of rivets 10. Other rivets 11 are used for attaching the channel iron member to the suspension bracket. On the axle on each side of the channel iron member is a pulley composed of two similarly formed halves 12 and a hub 13. These halves and their hub parts are connected together to form a complete pulley by means of bolts 14. By means of these bolts the pulleys are gripped to the axle with an intervening rubber bushing 14a. This rubber bushing serves to allow a certain amount of adjustment between the two parts of the pulley, and also serves to deaden shocks.

The suspension bracket 6 supports a gear box 15, outside of the end sill, and for that purpose there is provided a plurality of links, each link being pivoted at one end to the suspension bracket. There are four of these links, two on each side of the gear box. The pair of links 16 remote from the axle is attached to the suspension bracket by means of a pin 17. The lower ends of the links of this pair are provided with a pin 18 which passes through the ends of the links and also through ears 19 located beneath one end of the gear box. The links 20 of the other pair are supported at their upper ends by means of a pin 21 and have extending through their lower ends a pin 22 by which the lower ends of the links are connected to ears 23 on the lower side of the gear box adjacent the axle.

This gear box, thus suspended, can reciprocate back and forth longitudinaly of the car body. This reciprocation is limited by resilient means which consists of a pair of tension rods 24, each rod being pivoted at one end by means of an ear 25 to the gear box. The other ends of these rods are supported by means of an arm 26 extending downwardly from the suspension bracket and provided with holes to receive the rods. On the end of each rod remote from the ear is a nut 27 to limit the movement of the gear box away from the axle.

Around each tension rod and between the arm and the adjustable abutment 29 is a spring 28. These abutments are adjusted for the purpose of varying the tension on the springs by means of nuts 29a. Extending transversely through the gear box is a shaft 30, which has on each end without the box a pulley 31. In the form shown in Figure 1 each of these pulleys has a single V-shaped groove in which a belt 32 fits and extends to one of the pulleys on the axle, which has a correspondingly shaped groove. This transverse shaft is driven by means of these belts from the axle. The tension of the belts may be varied by adjusting the abutments on the tension rods. The belts are of the side-drive form, in which the sides of the belts engage the sides of the groves of the pulleys. Each belt may be formed of a single piece of belt material of the desired form and nature, and connected by means of a suitable coupling.

The gear box is also provided with a shaft 33 operatively connected at one end of the transverse shaft 30 by means of suitable gearing. This shaft 33 has a longitudinally disposed shaft located in line with the channel iron member 9. To this shaft 33 is connected one end of a section 34 of a splined shaft by means of a universal joint 35. The other section 36 of this splined shaft is connected to an armature shaft 37 of a generator 38 by means of a universal joint connection 35a. The generator has extending from one side thereof a bracket 39 by which it may be rigidly supported on the under side of the body frame. This generator is supported immediately beneath the center of the body of the car.

The universal joint connections between the splined shaft and the other shafts permit the necessary free turning of the truck with regard to the body without interfering with the operation of the generator. The splined connections take care of any movement of the truck with relation to the generator to and away from each other. In other words, this splined movement takes care of oscillations of the truck with relation to the car body. The body, which is shown merely as to the frame, is indicated by the numeral 40.

In the form in which the generator is located to one side of the center line, the splined shaft is connected at one end by the universal joint to a counter-shaft 42 supported by means of the frame 41 suitably supported beneath the frame 40 of the car body. This counter-shaft is supported in suitable bearings and has on its end remote from the splined shaft a pulley 43, which has therein a plurality of V-shaped groves for receiving correspondingly shaped belts. The generator 44 has extending from the upper side thereof a plurality of rigid arms 45, which are connected at their outer ends by means of a rigid sleeve 46 through which a pin 47 passes for supporting the generator on the frame 41 beneath the body frame 40.

The armature shaft is provided with a pulley 48 having therein a plurality of V-shaped groves. The pulley 43 and the pulley 48 are connected by means of V-shaped belts 49, one for each groove. To one side of the generator is attached brackets 50 in any suitable manner. To each bracket is pivotally attached one end of a bolt 51 by means of a pivot pin 52. The free ends of these bolts are threaded and extend through suitable holes in a bracket 53 attached to the frame 41. For the purpose of adjusting the bolts with relation to the bracket 53 and for adjusting the generator for tensioning the belts, the bolts are provided with nuts 54, two for each bolt.

In this form the generator is supported for swinging movement transversely of the car body, and is held in adjusted position by means of the bolts 51 and the nuts thereon engaging the bracket 53. By adjusting the position of the generator and the pulley on the generator shaft the tension of the belts may be adjusted. In this form the generator being located adjacent the side of the car may be readily accessible for repair and removal and replacement if necessary. The generator can be removed and another one placed in its stead merely by removing the pin that supports the generator on the frame and by removing one nut from each bolt 51.

In both forms the connection between the axle and the transverse shaft is such that any oscillation of the truck by which the car body is caused to move with relation to the truck may be cared for by the resilient adjustment between the gear box and the truck frame. Any movement between the truck frame and the body may be taken care of by the universal joint connection and the splined nature of the shaft connecting the generator to the gear box. The support of the gear box enables the belts to be removed without interfering with the operating parts. The nuts on the ends of the tension rods may be so screwed that the springs are compressed, the pulleys are brought nearer to each other so that the belts may be removed and new belts placed on the pulleys, or the pulleys may be brought together so that the tension on the belts may be removed for repair of the belts or for the purpose of preserving the quality of the belts. By bringing the pulleys together by means of the tension device the generator becomes a motoring generator which, when inspected by the yard crew, the electrician may run as a motor to see that all parts are functioning properly.

It is particularly noted that the depending links which form a cradle for the gear box are so arranged that the gear box will move fore and aft, the plane of movement being in the horizontal substantially, due to the swinging of the links. This movement is restrained by the shock-absorbing spring associated therewith, but by reason of this straight-line movement of the gear box in the cradle the relationship of the parts is maintained except for changing the distance between the centers. The telescopic driving shaft permits of the accommodation of differences in centers between the point of attachment of the generator on the under side of the car body and the point of attachment of the gear box and driving mechanism on the swinging truck.

One of the particular advantages of applicant's structure is that the gear box unit is mounted outside of the end sill. Heretofore it has been impossible to thus mount the gear box. One of the reasons was that it was feared that the weight of the gear box, suspended so far from the pivot center of the truck, would act as a lever, causing a bouncing up-and-down effect. Also the spline shafts with universal couplings have not given the greater degree of angularity necessary when the point of attachment of the universal joint is so far away from the pivot center of the truck. Another reason was that it was thought that there would be too much twisting, due to torque, on the end frame of the truck, or end sill.

I desire to comprehend within my invention such modifications as may be embraced within my claims and the scope of my invention.

Having thus fully described my invention, what I claim as new and desire to secure by Letters Patent, is:

1. In combination with a body and an axle-supported frame for supporting the body, a generator supported by the body laterally from the center line of the body for swinging transverely of the body, a counter-shaft supported on the body longitudinally of the center thereof, a pulley on the counter-shaft, a pulley on the armature shaft of the generator, each pulley having therein a plurality of V-shaped grooves, V-shaped belts in the grooves connecting the pulleys, means to adjust the generator to tension the belts, and means operatively connected to the axle for rotating the counter-shaft.

2. In combination with a body and an axle-supported frame for supporting the body, a generator supported by the body laterally from the center line of the body for swinging transversely of the body, a counter-shaft supported on the body longitudinally of the center thereof, a pulley on the counter-shaft, a pulley on the armature shaft of the generator, each pulley having therein a plurality of V-shaped grooves, V-shaped belts in the grooves connecting the pulleys, means to adjust the generator to tension the belts, and means operatively connected to the axle for rotating the counter-shaft, said last-named means comprising a gear box having a transverse shaft operatively connected to the axle, a longitudinally extending shaft in the gear box geared to the transverse shaft and a shaft connected to the longitudinally extending shaft and to the counter-shaft by universal joints.

3. In combination with a body and an axle-supported frame for supporting the body, a generator supported by the body laterally from the center line of the body for swinging transversely of the body, a counter-shaft supported on the body longitudinally of the center thereof, a pulley on the counter-shaft, a pulley on the armature shaft of the generator, each pulley having therein a plurality of V-shaped grooves, V-shaped belts in the grooves connecting the pulleys, means to adjust the generator to tension the belts, and means operatively connected to the axle for rotating the counter-shaft, said last-named means comprising a gear box having a transverse shaft operatively connected to the axle, a longitudinally extending shaft in the gear box geared to the transverse shaft and a shaft connected to the longitudinally extending shaft and to the counter-shaft by universal joints, said last-named shaft consisting of two sections, one splined within the other.

ERWIN J. SCHMIDT.